(12) United States Patent
Robinson

(10) Patent No.: US 10,248,912 B1
(45) Date of Patent: Apr. 2, 2019

(54) SYSTEMS AND METHODS FOR DISPLAYING TRAVEL ITINERARIES

(71) Applicant: Google Inc., Mountain View, CA (US)

(72) Inventor: Hugh Michael Robinson, Cambridge, NC (US)

(73) Assignee: GOOGLE LLC, Mountain View, CA (US)

( * ) Notice: Subject to any disclaimer, the term of this patent is extended or adjusted under 35 U.S.C. 154(b) by 770 days.

(21) Appl. No.: 14/641,043

(22) Filed: Mar. 6, 2015

(51) Int. Cl.
*G06Q 10/02* (2012.01)
*G06Q 50/14* (2012.01)
*G06Q 30/06* (2012.01)
*G06F 17/30* (2006.01)

(52) U.S. Cl.
CPC ....... *G06Q 10/02* (2013.01); *G06F 17/30905* (2013.01); *G06Q 30/0627* (2013.01); *G06Q 50/14* (2013.01)

(58) Field of Classification Search
CPC .... G06Q 50/14; G06Q 30/0627; G06Q 10/02; G06F 17/30905
USPC .......................................................... 705/5
See application file for complete search history.

(56) References Cited

U.S. PATENT DOCUMENTS

| | | | |
|---|---|---|---|
| 6,307,572 B1 | 10/2001 | Demarcken et al. | |
| 7,263,664 B1 | 8/2007 | Daughtrey | |
| 2006/0235768 A1* | 10/2006 | Tatum, Jr. ............... | G06Q 10/02 705/28 |
| 2007/0156469 A1 | 7/2007 | Bird et al. | |
| 2008/0222566 A1 | 9/2008 | Daughtrey et al. | |
| 2012/0089424 A1* | 4/2012 | Weyhausen ............ | G06Q 10/02 705/5 |
| 2013/0024404 A1* | 1/2013 | Zacharia ................ | G06Q 10/02 706/12 |
| 2014/0052714 A1 | 2/2014 | Brodziak et al. | |

(Continued)

OTHER PUBLICATIONS

Gerard Granet. Coordinate Transformation Methods. E. Popov, ed. Gratings: Theory and Numeric Applications, AMU (PUP), pp. 8.1-8.30, 2012, 978-2-8539-9860-4; available at: https://hal.archives-ouvertes.fr/hal-00783940/document (Year: 2012).*

(Continued)

*Primary Examiner* — George Chen
*Assistant Examiner* — Emmett K. Walsh
(74) *Attorney, Agent, or Firm* — Johnson, Marcou & Isaacs, LLC

(57) ABSTRACT

Systems and methods of this disclosure are directed to displaying travel itineraries. In some implementations, a system receives a search request for a travel itinerary, and identifies a candidate travel itinerary that includes a departure time, an arrival time, a duration, and a price. The system generates a first coordinate on a first axis of a multidimensional graph corresponding to the departure time, and a second coordinate on a second axis corresponding to the arrival time. The system generates a location on the multidimensional graph for the first coordinate and the second coordinate that indicates the duration of the candidate travel itinerary. The system creates a data structure for the candidate travel itinerary and allocates an icon to the data structure. The system sets an attribute of the icon based on the price of the candidate travel itinerary, and provides the icon for display with the multidimensional graph.

20 Claims, 5 Drawing Sheets

(56) References Cited

U.S. PATENT DOCUMENTS

2014/0351037 A1* 11/2014 Shaam .................. G06Q 50/14
                                                        705/14.23

OTHER PUBLICATIONS

Matrix Algebra and Affine Tansformations, Chapter 5; Accessed via internet Archive for Dec. 28, 2013, available at: https://web.archive.org/web/20131228085227/https://people.cs.clemson.edu/~dhouse/courses/401/notes/affines-matrices.pdf (Year: 2013).*
Gerard Granet Coordinate Transformation Methods; E. Popov. Ed. Gratings: Theory and Numeric Applications, AMU PUP, pp. 8, 1-8, 30, 2012, 978-8539-986-4; available at: https://hal.archives-ouvertes.fr/hal-00783940/document (Year: 2012).*
International Search Report for PCT Application No. PCT/FR2012/050084, dated Apr. 10, 2012.
U.S. Appl. No. 14/089,157, filed Nov. 25, 2013, Robinson.

* cited by examiner

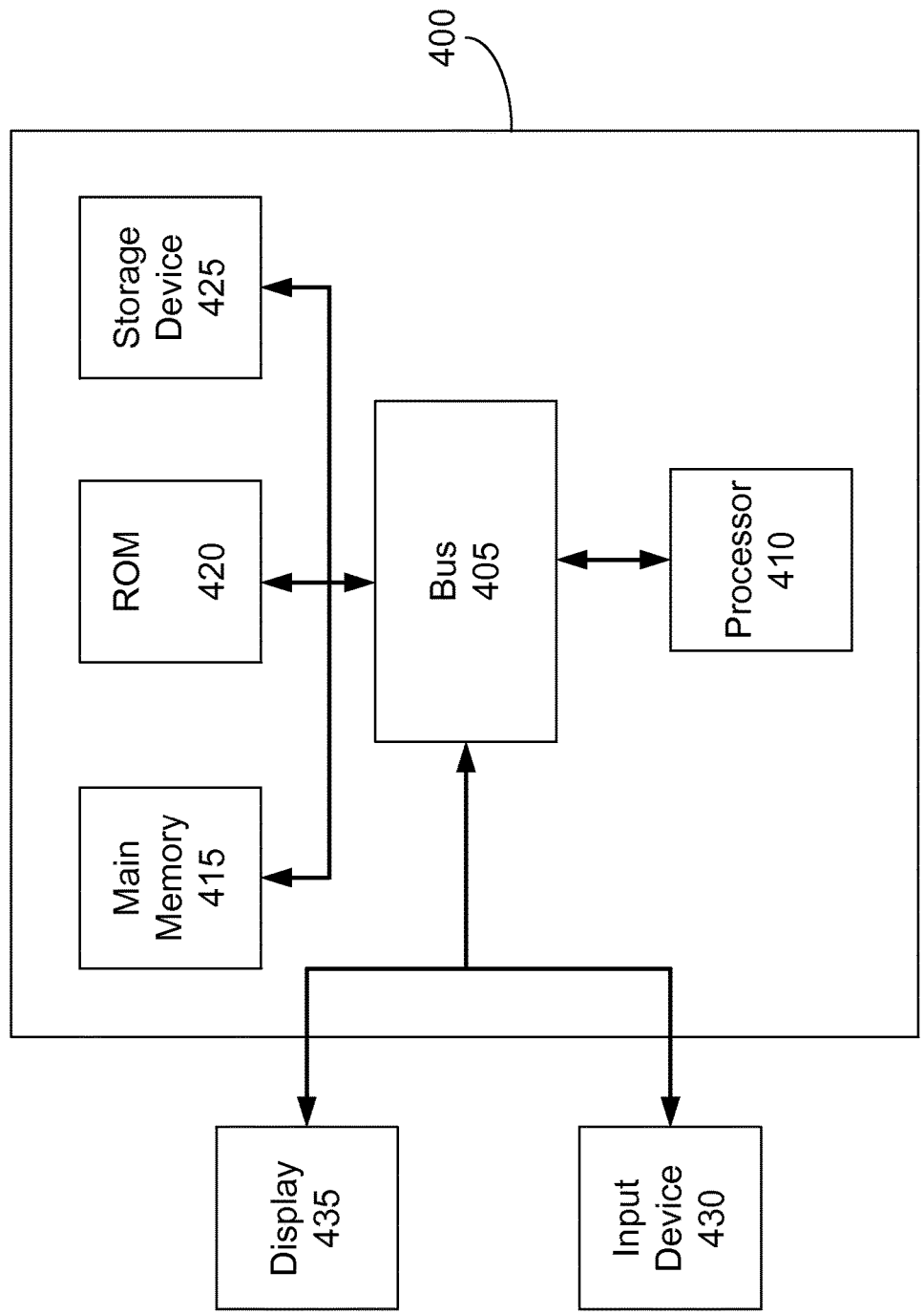

SYSTEMS AND METHODS FOR DISPLAYING TRAVEL ITINERARIES

BACKGROUND

In a networked environment such as the Internet, entities such as people or companies can provide information related to transportation for public display on web pages or other documents. The web pages can include text, video, or audio information provided by the entities via a web page server for display on the Internet. Entities can search for transportation information via the networked environment.

SUMMARY

At least one aspect is directed to a method of displaying travel itineraries via a computer network. The method includes an itinerary engine receiving a search request for a travel itinerary. The search request includes a departure location and an arrival location. The itinerary engine can execute on one or more processors of a data processing system. The method includes the itinerary engine identifying a candidate travel itinerary responsive to the search request. The candidate travel itinerary can include a departure time, an arrival time, a duration, and a price. The itinerary engine can use a database storing travel information to identify the candidate travel itinerary. The method includes the itinerary engine generating a first coordinate on a first axis of a multidimensional graph corresponding to the departure time of the candidate travel itinerary. The method includes the itinerary engine generating a second coordinate on a second axis of the multidimensional graph corresponding to the arrival time of the candidate travel itinerary. The method includes the itinerary engine generating a location on the multidimensional graph for the first coordinate and the second coordinate. The location indicates the duration of the candidate travel itinerary. The method includes the itinerary engine creating a data structure in memory for the candidate travel itinerary. The data structure can indicate the location. The method can include the itinerary engine allocating an icon to the data structure. The method can include the itinerary engine setting an attribute of the icon of the candidate travel itinerary based on the price of the candidate travel itinerary. The method can include the data processing system providing the icon allocated to the data structure to a display device. The data processing system can provide the icon via the computer network for display with the multidimensional graph by the display device.

Another aspect is directed to a system for displaying travel itineraries via a computer network. The system can include a data processing system. The data processing system can include one or more processors, memory, an itinerary engine, and an interface. The database stores, in memory, travel information. The itinerary engine is configured to receive a search request for a travel itinerary. The search request includes a departure location and an arrival location. The itinerary engine is further configured to identify, using the database, a candidate travel itinerary responsive to the search request. The candidate travel itinerary includes a departure time, an arrival time, a duration, and a price. The itinerary engine is further configured to generate a first coordinate on a first axis of a multidimensional graph corresponding to the departure time of the candidate travel itinerary. The itinerary engine is further configured to generate a second coordinate on a second axis of the multidimensional graph corresponding to the arrival time of the candidate travel itinerary. The itinerary engine is further configured to generate a location on the multidimensional graph for the first coordinate and the second coordinate. The location indicates the duration of the candidate travel itinerary. The itinerary engine is further configured to create a data structure in memory for the candidate travel itinerary. The data structure indicates the location. The itinerary engine is further configured to allocate an icon to the data structure. The itinerary engine is further configured to set an attribute of the icon of the candidate travel itinerary based on the price of the candidate travel itinerary. The interface is configured to provide the icon allocated to the data structure to a display device via the computer network for display with the multidimensional graph by the display device.

At least one aspect is directed to a non-transitory computer readable medium storing instructions that, when executed by one or more processors, displays travel itineraries via a computer network. The instructions include instructions to receive a search request for a travel itinerary. The search request includes a departure location and an arrival location. The instructions include instructions to identify, using a database storing travel information, a candidate travel itinerary responsive to the search request. The candidate travel itinerary includes a departure time, an arrival time, a duration, and a price. The instructions include instructions to generate a first coordinate on a first axis of a multidimensional graph corresponding to the departure time of the candidate travel itinerary. The instructions include instructions to generate a second coordinate on a second axis of the multidimensional graph corresponding to the arrival time of the candidate travel itinerary. The instructions include instructions to perform a shear transformation using the first coordinate and the second coordinate to generate a location on the multidimensional graph. The location is indicative of the duration of the candidate travel itinerary. The instructions include instructions to create a data structure in memory for the candidate travel itinerary. The data structure indicates the location. The instructions include instructions to allocate an icon to the data structure. The instructions include instructions to set an attribute of the icon of the candidate travel itinerary based on the price of the candidate travel itinerary. The instructions include instructions to generate the multidimensional graph with the icon allocated to the data structure. The instructions include instructions to provide the multidimensional graph with the icon to a display device via the computer network for display with the multidimensional graph by the display device.

BRIEF DESCRIPTION OF THE DRAWINGS

The details of one or more implementations of the subject matter described in this specification are set forth in the accompanying drawings and the description below. Other features, aspects, and advantages of the subject matter will become apparent from the description, the drawings, and the claims.

FIG. 4 is a block diagram illustrating a general architecture for a computer system that may be employed to implement various elements of the system shown in FIG. 1 and the method shown in FIG. 2, among others, in accordance with an implementation.

Like reference numbers and designations in the various drawings indicate like elements.

DETAILED DESCRIPTION

Systems and methods of the disclosure are directed generally to displaying travel itineraries. A data processing systems can receive search criteria related to identifying one or more predetermined itineraries via one or more transportation modes. A transportation mode may include, e.g., bus, train, airplane, carpool, taxi, limo service, or other transportation mode. A predetermined itinerary, or itinerary, may include, e.g., scheduled flight, bus schedule, train schedule, etc. For instance, when a user is interested in booking a flight using an online flight search engine, the user can provide some general criteria (e.g., origin city, destination city, date of outbound travel, date of return travel) and the flight search engine returns a list of possible bookings (e.g., itinerary) which satisfy these criteria. The potential itineraries can number in the hundreds, thousands, or more. For example, for a coast-to-coast round trip in the United States, there may be hundreds of outbound itineraries and hundreds of inbound itineraries. The ticket price can depend on which outbound is combined with which inbound, so the outbound and inbound choice problems can't be separated from each other.

In an illustrative implementation, a problem to be solved by a flight search service may be to help a user find a travel itinerary. The user may have preferences between the itineraries based on cost, airlines, departure time, arrival time, number, location and duration of intermediate stops, and so forth. It may be challenging or inefficient for the user to articulate these preferences. Systems and methods of the present disclosure can facilitate summarizing available itineraries that match search criteria input by the user such that the user can identify a preferred itinerary.

Figure 3A:
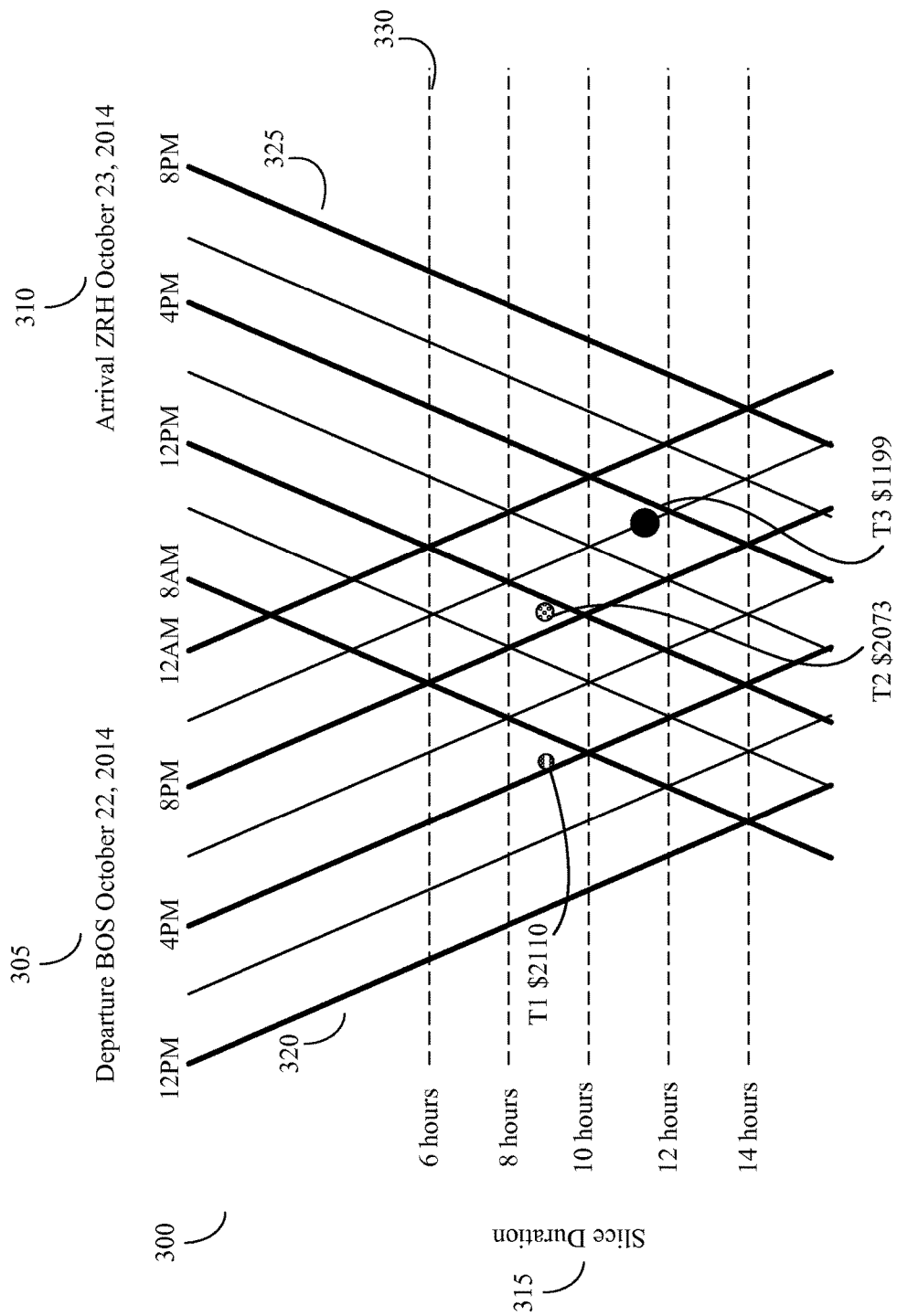
FIGS. 3A & 3B are illustrations of graphical user interfaces for displaying travel itineraries in accordance with implementations.
Figure 3B:
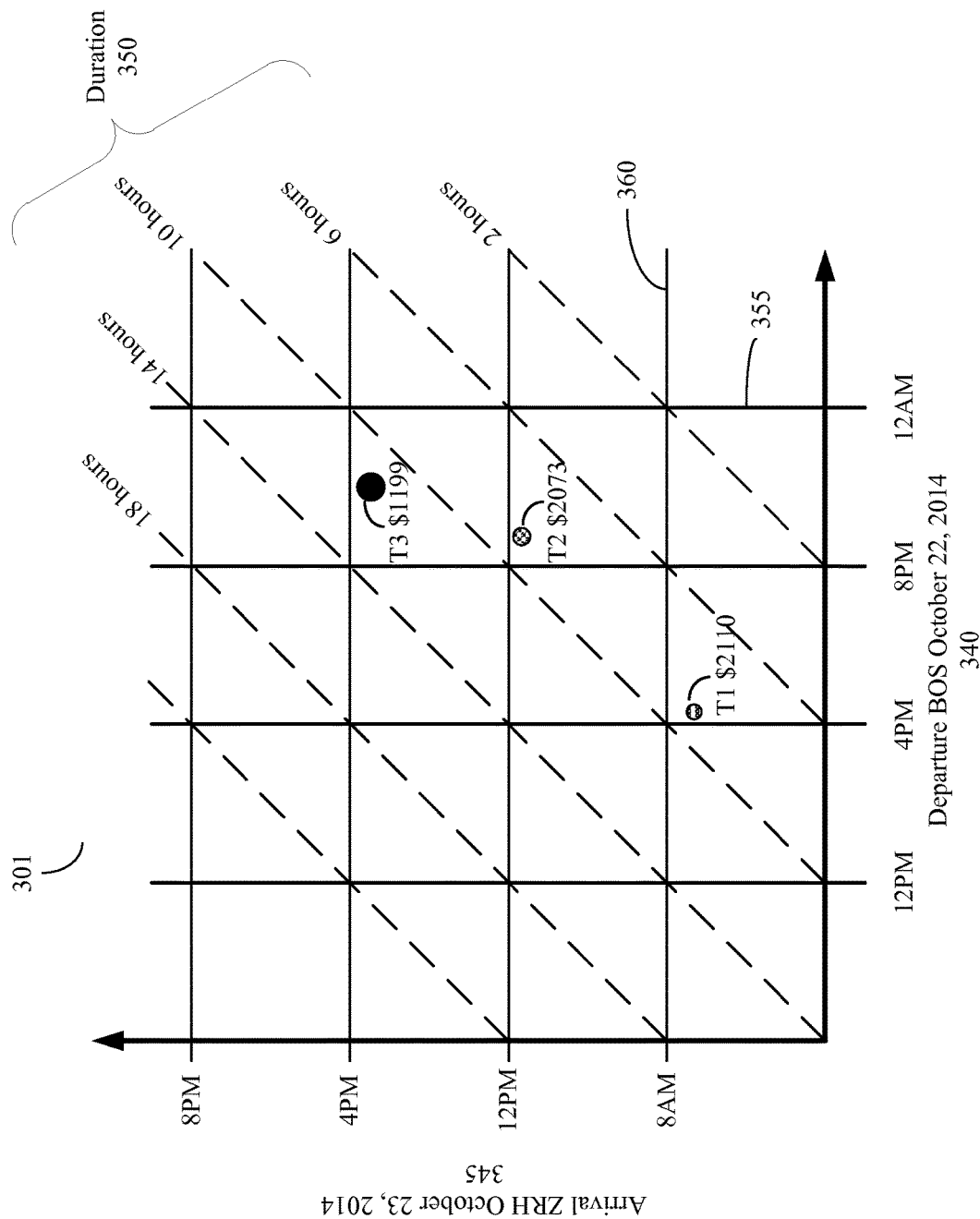

Rather than provide a list of itineraries in a list format, systems and methods of the present disclosure can generate an interactive time-time scatter plot to display a flight itinerary, or to simultaneously display multiple flight itineraries. A flight slice of the scatter plot can represent the entire itinerary from the origin to the destination. For example, instead of presenting a list of possible itineraries, a flight search engine of the present solution can represent the set of possible itineraries to the user as a scatter plot for each flight slice, as illustrated in FIGS. 3A & 3B. For example, each itinerary can be represented by a point on the scatter plot as follows: the X-coordinate represents the departure time of the itinerary at the slice origin and the Y-coordinate represents the arrival time at the slice destination. The location of an icon corresponding to the itinerary on the graph is independent of the price of the itinerary. That is, the location is determined based only on the departure time and arrival time (and potentially duration), but is not determined based on the price of the itinerary.

As a consequence of these choices of the x- and y-coordinates, itineraries of equal duration can have equal values of (x minus y), so they lie along straight lines in a diagonal direction, for example. A scale for this third direction can also be shown on the scatter plot. The scatter plot may be rotated or sheared so that the duration direction is vertical or horizontal and the "x-" and "y-" (origin and destination time) directions are oblique, as illustrated in FIG. 3A.

The color, fill pattern, brightness, or size of the point on the scatter plot (e.g., points T1, T2 and T3 in FIGS. 3A & 3B) can be chosen to convey the price or airline of the corresponding itinerary. The hue or fill pattern can be chosen depending on the airline (e.g., the operating carrier of the flight, or in the case of an itinerary consisting of multiple flights with different operating carriers, the operating carrier responsible for the largest part of the duration of the itinerary). The saturation or value of the color or the size of the point can be chosen to convey the price: e.g., less expensive itineraries can have larger points or have colors that contrast more strongly with the background, so that they stand out more clearly (e.g., T3 shown in FIG. 3A).

For some or all itineraries (depending on the amount of visual clutter) the points may also be labeled with brief text showing the exact price or airline or stopover airports. For example, FIG. 3A shows points T1, T2 and T3 labeled with price $2110, $2073 and $1199, respectively. The labels "T1", "T2", and "T3" can represent the name of the travel provider, airline, bus company, or train company. If not already labeled, this information can be brought up for any specific itinerary by hovering with the mouse or clicking or touching the corresponding point.

Since the price of an itinerary can depend on the rest of the journey (for example the price of an outbound itinerary can sometimes only be determined once a particular return itinerary is chosen), the present solution can initially define the price of an itinerary to be the price of the cheapest journey of which it forms part. Once the user has chosen an itinerary for one slice of a journey, the system can, when presenting the UI for another slice, determine the price based on the cheapest possible journey that includes the already-selected itineraries.

In the event the scatter plot graphical display of itineraries is too cluttered (e.g., a user query that provides too many flights results), the UI can include checkboxes to filter results based on, e.g., airline, number of stops, or price. The price thresholds at which points become larger or brighter or labeled with textual price and airline information can be configured by the user.

Figure 1:
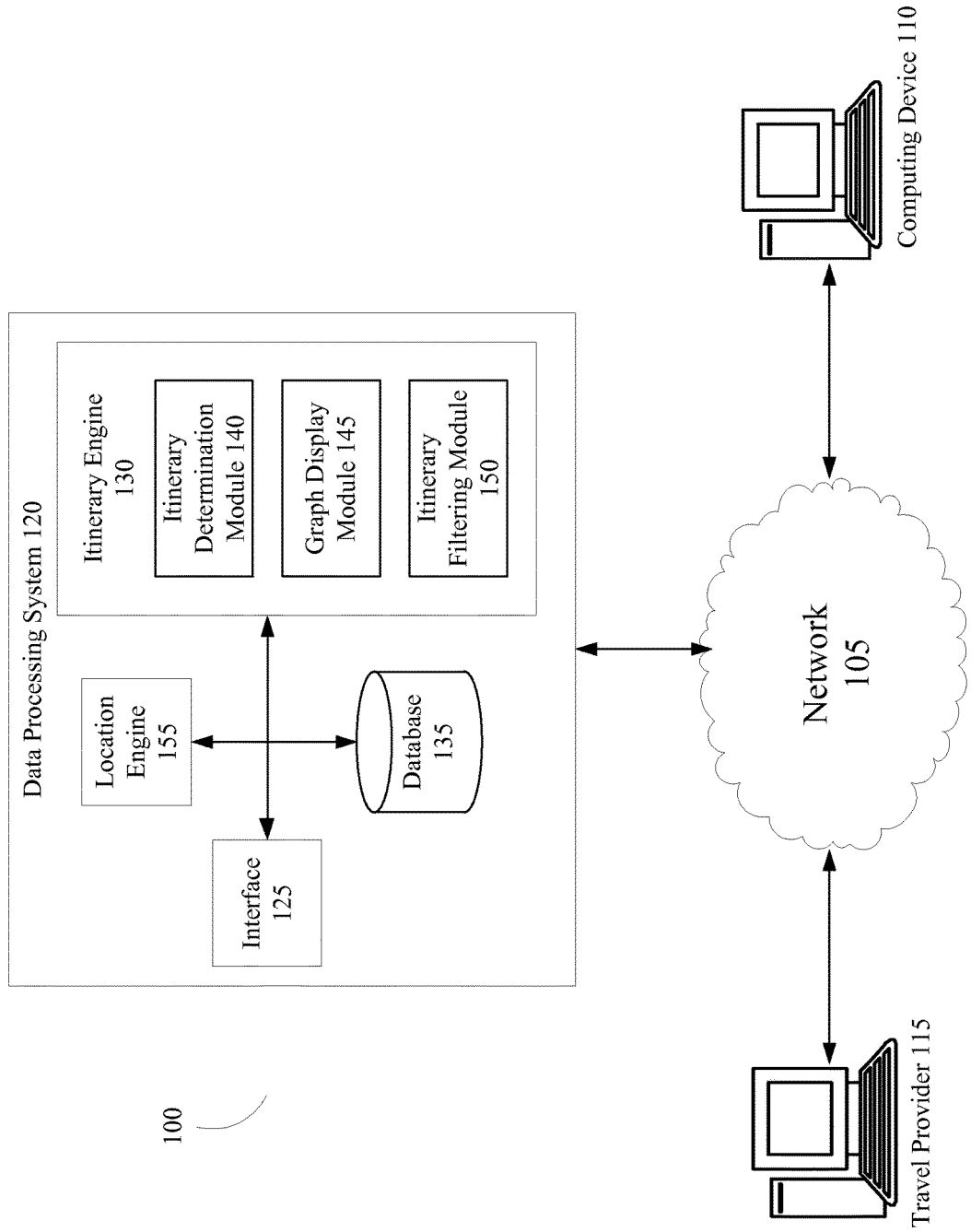
FIG. 1 is an illustration of a system for displaying travel itineraries via a computer network in accordance with an implementation.

FIG. 1 illustrates an example system 100 for displaying travel itineraries via a computer network such as network 105. The network 105 can include computer networks such as the Internet, local, wide, metro, or other area networks, intranets, satellite networks, and other communication networks such as voice or data mobile telephone networks. The network 105 can be used to access information resources such as web pages, web sites, domain names, or uniform resource locators that can be displayed on at least one computing device 110, such as a laptop, desktop, tablet, personal digital assistant, smart phone, or portable computers. For example, via the network 105 a user of the computing device 110 can access web pages provided by the data processing system 120, a travel provider 115, or other website publisher or content publisher. In this example, a web browser of the computing device 110 can access a web server of the data processing system 120, content publisher or travel provider 115 to retrieve a web page for display on a monitor of the computing device 110. The web site operator or 115 generally includes an entity that operates the web page. In one implementation, the web site operator or content publisher 115 includes at least one web page server that communicates with the network 105 to make the web page available to the computing device 110.

The network 105 may be any type or form of network and may include any of the following: a point-to-point network, a broadcast network, a wide area network, a local area network, a telecommunications network, a data communication network, a computer network, an ATM (Asynchronous Transfer Mode) network, a SONET (Synchronous Optical Network) network, a SDH (Synchronous Digital Hierarchy) network, a wireless network and a wireline network. The network 105 may include a wireless link, such as an infrared channel or satellite band. The topology of the network 105 may include a bus, star, or ring network topology. The network may include mobile telephone networks using any protocol or protocols used to communicate among mobile devices, including advanced mobile phone protocol ("AMPS"), time division multiple access ("TDMA"), code-division multiple access ("CDMA"), global system for mobile communication ("GSM"), general packet radio services ("GPRS") or universal mobile telecommunications system ("UMTS"). Different types of data may be transmitted via different protocols, or the same types of data may be transmitted via different protocols.

The system 100 can include at least one data processing system 120. The data processing system 120 can include at least one logic device such as a computing device having a processor to communicate via the network 105, for example with the computing device 110, the web site operator or content publisher 115, and at least one content provider 125. The data processing system 120 can include at least one server. For example, the data processing system 120 can include a plurality of servers located in at least one data center. The data processing system 120 can include multiple, logically-grouped servers and facilitate distributed computing techniques. The logical group of servers may be referred to as a server farm or a machine farm. The servers can also be geographically dispersed. A machine farm may be administered as a single entity, or the machine farm can include a plurality of machine farms. The servers within each machine farm can be heterogeneous—one or more of the servers or machines can operate according to one or more type of operating system platform.

Servers in the machine farm can be stored in high-density rack systems, along with associated storage systems, and located in an enterprise data center. For example, consolidating the servers in this way may improve system manageability, data security, the physical security of the system, and system performance by locating servers and high performance storage systems on localized high performance networks. Centralizing the servers and storage systems and coupling them with advanced system management tools allows more efficient use of server resources.

The data processing system 120 can include a content placement system having at least one server. The data processing system 120 can also include at least one interface 125, at least itinerary engine 130, at least one itinerary determination module 140, at least one graph display module 145, at least one itinerary filtering module 150, and at least one database 135. In some implementations, the itinerary engine 130 may include the at least one itinerary determination module 140, the at least one graph display module 145, and the at least one itinerary filtering module 150. The interface 125, itinerary engine 130, itinerary determination module 140, graph display module 145, and itinerary filtering module 150 can each include at least one processing unit or other logic device such as programmable logic array engine, or module configured to communicate with the database 135. The interface 125, itinerary engine 130, itinerary determination module 140, graph display module 145, and itinerary filtering module 150 can be separate components, a single component, or part of the data processing system 120. The system 100 and its components, such as a data processing system 120, may include hardware elements, such as one or more processors, logic devices, or circuits.

The data processing system 120 can obtain anonymous computer network activity information associated with one or more computing devices 110. A user of a computing device 110 can affirmatively authorize the data processing system 120 to obtain network activity information corresponding to the user's computing device 110. For example, the data processing system 120 can prompt the user of the computing device 110 for consent to obtain one or more types of network activity information, such as geographic location information. The identity of the user of the computing device 110 can remain anonymous and the computing device 110 may be associated with a unique identifier (e.g., a unique identifier for the user or the computing device provided by the data processing system 120 or a user of the computing device). The data processing system 120 can associate each observation with a corresponding unique identifier.

For situations in which the systems discussed here collect personal information about users, or may make use of personal information, the users may be provided with an opportunity to control whether programs or features that may collect personal information (e.g., information about a user's social network, social actions or activities, a user's preferences, or a user's current location), or to control whether or how to receive content from the content server that may be more relevant to the user. In addition, certain data may be treated in one or more ways before it is stored or used, so that certain information about the user is removed when generating parameters (e.g., demographic parameters). For example, a user's identity may be treated so that no identifying information can be determined for the user, or a user's geographic location may be generalized where location information is obtained (such as to a city, ZIP code, or state level), so that a particular location of a user cannot be determined. Thus, the user may have control over how information is collected about the user and used by a content server.

The data processing system 120 can receive a request for content, such as a travel itinerary, online document, resource, or advertisement. The request may include a query such as a search query or itinerary query input into a search engine or itinerary engine 130. The input query may include text, characters, symbols, numbers, formatting, etc. The data processing system 120 may receive the input query from a computing device 110 via network 105. In some implementations, the input query may include audio (e.g., words spoken by a user of the computing device 110 and input into the search engine of the data processing system 120 via network 105 and interface 125).

Responsive to the search query or other request for content, the data processing system 120 can identify, select or otherwise obtain content to be provided or presented via the computing device 110 making the request, or some other computing device 110 associated with the request for content. The content may include, e.g., text, characters, symbols, images, video, audio, or multimedia content. The request for content can include a request for an online advertisement, article, promotion, coupon, travel itinerary or product description. The data processing system 120 can receive the request from a computing device such as, e.g., computing device 110. For example, the data processing system 120 can receive the request via an application executing on the computing device 110, such as a mobile application executing on a mobile device (e.g., smart phone or tablet) may make a request for content. In some instances, a web page may request content from the data processing system 120 responsive to a user of a mobile device (e.g., computing device 110) visiting the web page (e.g., via the mobile device).

The request for content can include information that facilitates content selection. In some implementations, the data processing system 120 may request information from the computing device 110 to facilitate identifying content or content selection. The data processing system 120 may request or obtain information responsive to receiving a request for content from the computing device 110. The information may include information about displaying the content on the computing device 110 (e.g., a content slot size or position) or available resources of computing device 110 to display or otherwise manipulate the content.

The data processing system 120 can include an interface 125 designed and constructed to receive, access, obtain, transmit, convey or otherwise communicate with one or more component of the data processing system 120 or device (e.g., travel provider 115 and computing device 110) via network 105. In some implementations, the interface module 125 is configured to receive a search query provided via a user device 110. The search query may be input into a search engine of, associated with, or otherwise communicatively coupled to data processing system 120. The data processing system 120 can store the search query in a database 135 for later processing. In some implementations, the data processing system 120 provides or otherwise conveys the search query to the itinerary engine 140 for further processing. The interface module 125 can receive travel itinerary information from a travel provider 115 and store this information in a database 135 or otherwise transmit or convey the information to one or more component of the data processing system 120 for further processing.

The interface 125 can be further designed and constructed to provide, generate, transmit, or otherwise present a graphical user interface via the computing device 110, such as the graphical user interfaces illustrated in FIG. 3A. Interface 125 may be configured to generate a user interface through which user devices or computing devices 110 can submit a search request for a travel itinerary. For example, interface 125 may generate a graphical user interface (e.g., an application front end, a webpage, an electronic document, etc.) having one or more user-fillable form fields (e.g., search fields), drop-down boxes, check-boxes, or other elements capable of receiving a user selection and/or user-provided data. The user interface may be configured to receive search parameters to guide the travel itinerary search.

Interface 125 may prompt user devices 110 to provide search parameters. For example, interface 125 may generate and display a form field labeled "Start Location" or "Origin City," prompting computing devices 110 to enter the name or location of a starting point for the desired travel itinerary. As another example, interface 125 may generate and display a form field labeled "End Location" or "Destination City," prompting computing device 110 to enter the name or location of an ending point for the desired travel itinerary. In some implementations, interface 125 prompts computing device 110 to enter or select an outbound travel time (e.g., a time window, a date, a range of dates, etc.) and an inbound travel time. Interface 125 may prompt computing device 110 to indicate whether the desired travel itinerary is a one-way trip or a round-trip.

Interface 125 may be configured to receive additional search parameters such as a desired price range, a preferred airline or modality of travel, or other parameters to further narrow the travel itinerary search. In various implementations, interface 125 may provide separate form fields for each parameter or may allow multiple parameters to be entered into a single form field. For example, interface 125 may parse the content of a form field to associate a search term with a specific parameter or parameter type (e.g., identifying and associating a date with a departure time or a return time, associating a name of a city with an origin location or a destination location, etc.).

Interface 125 may be configured to receive a request (e.g., from computing device 110) for a travel itinerary that satisfies the search parameters provided via the search interface. Interface 125 may identify the parameters of the search request and provide the search parameters to itinerary determination module 140. The search parameters provided to itinerary determination module 140 may include a parameter name (e.g., "origin city," "departure date," "departure airport," "destination city," etc.) and a parameter value or attribute (e.g., "Boston," "October 8," "LAX," etc.) for each search parameter.

The data processing system 120 can include a database 135. The database 135 can store information that facilitates optimizing generation of a travel itinerary. For example, the database 135 may be designed and constructed to store the information in one or more data structures in memory, storage, or a hard drive. The database 135 may be stored on the data processing system 120, or may be stored in another location, but be accessible to the data processing system 120 via network 105.

Data processing system 120 may facilitate communication between travel provider 115, databases 135, and itinerary engine 130. For example, travel provider 115 may generate travel arrangement data representing the various travel arrangements provided by travel provider 115 (e.g., flights, bus routes, train schedules, etc.). The travel arrangement data may include an origin location, a destination location, a departure time, and an arrival time for each travel arrangement. The travel arrangement data may be stored in a database of the travel provider 115, or provided to the data processing system 120 for storage in database 135. Data processing system 120 may query travel provider 115 or database 135 for the travel arrangement data and receive such data (or a subset thereof) via network 105.

Travel provider 115 may generate travel arrangement data representing various travel options that are available for sale or purchase. Travel arrangement data may include, for example, an origin location, a destination location, a departure time, and an arrival time for each travel arrangement (e.g., for each flight, for each bus route, etc.). Travel arrangement data may also include pricing information for various travel arrangements (e.g., one-way ticket price, round-trip ticket price, etc.) and/or other details relating to the travel arrangements (e.g., operating airline, marketing airline, modality of travel, cabin class, whether a meal is provided, etc.).

Travel provider 115 may operate electronic resources through which travel arrangement data is published or otherwise made available to other entities. Electronic resources operated by travel provider 115 may include any type of information or data structure that can be provided over network 105. Resources may include, for example, web pages (e.g., HTML web pages, PHP web pages, etc.), word processing documents, portable document format (PDF) documents, images, video, programming elements, interactive content, streaming video/audio sources, or other types of electronic information. In some implementations, resources may be identified by a resource address associated with each resource (e.g., a uniform resource locator (URL)). Resources may include content (e.g., words, phrases, images, sounds, etc.) having embedded information (e.g., meta-information embedded in hyperlinks) and/or embedded instructions. Embedded instructions may include computer-readable instructions (e.g., software code, JavaScript®, ECMAScript®, etc.) which are executed by user devices 108 (e.g., by a web browser running on computing devices 110). Travel provider 115 may store travel arrangement data in a database or data record and/or provide the travel arrangement data to data processing system 120.

In some implementations, a database may be local to travel provider 115. For example, a travel arrangements database may be computer servers or data centers operated by travel provider 115 to publish and/or store travel arrangement data. In other implementations, travel arrangements databases are remote data storage devices connected with travel provider 115 via network 105. Travel arrangements databases may store travel arrangements for a single travel provider or for multiple travel providers. For example, travel arrangements databases may be a third-party database (e.g., run by a travel agency or travel search service) that includes various travel options provided by multiple different travel providers 115.

In some implementations, travel arrangements databases are operated by the data processing system 120. For example data processing system 120 may gather travel arrangement data from multiple different travel providers 115 and store the combined travel arrangement data in databases 135. In some implementations, travel arrangements databases 135 are part of a data storage server or system capable of receiving and responding to queries from computing devices 110.

Computing devices 110 may be capable of submitting requests for travel itinerary data to data processing system 120. For example, a user may operate computing devices 110 to submit a request for a travel itinerary that satisfies user-provided search parameters. The search parameters may include, for example, an origin location (e.g., an origin city, an origin airport, an origin address, etc.), a destination location, a price range or limit, a departure time window (e.g., a departure date), a return time window (e.g., a return date), a desired modality of travel, and/or other parameters that specify desired attributes of a travel itinerary that the user is interested in purchasing. Computing devices 110 may submit the search request to data processing system 120 to perform a travel itinerary search and visualize the search results.

Computing devices 110 may be configured to receive and render display data generated by data processing system 120. In some implementations, computing devices 110 include an application (e.g., a web browser, a resource renderer, etc.) for converting electronic content into a user-comprehensible format (e.g., visual, aural, graphical, etc.). Computing devices 110 may include a user interface element (e.g., an electronic display, a speaker, a keyboard, a mouse, a microphone, a printer, etc.) for presenting content to a user, receiving user input, or facilitating user interaction with electronic content (e.g., clicking on a content item, hovering over a content item, etc.). Computing devices 110 may function as a user agent for allowing a user to view HTML encoded content (e.g., webpages operated by travel providers 115 and/or data processing system 120).

Computing devices 110 may include a processor capable of processing embedded information (e.g., meta information embedded in hyperlinks, HTML code, etc.) and executing embedded instructions. Embedded instructions may include computer-readable instructions (e.g., software code, JavaScript®, ECMAScript®, etc.) associated with a user interface generated by itinerary visualization system 112 (e.g., graphical user interface 300, described in greater detail with reference to FIG. 3A).

In some implementations, computing devices 110 are capable of detecting an interaction with the user interface generated by data processing system 120 or the multidimensional graph presented therein. An interaction with the multidimensional graph may include viewing the graph, hovering over a portion of the graph, selecting a portion of the graph (e.g., clicking on a particular itinerary represented on the graph), viewing additional information for a selected itinerary, interacting with one or more filtering elements (e.g., selecting a check-box, selecting a search-narrowing parameter, etc.), or any other type of interaction between computing devices 110 and the user interface.

Computing devices 110 may generate a variety of user actions. For example, computing devices 110 may generate a user action in response to a detected interaction with a portion of the graph generated by data processing system 120 (e.g., selecting a particular itinerary displayed on the graph). The user action may include a plurality of attributes including an itinerary identifier (e.g., an itinerary ID or signature element), a device identifier, a timestamp, or any other attributes describing the interaction. Computing devices 110 may generate user actions when particular actions are performed by a user device (e.g., resource views, itinerary purchases, search queries submitted, etc.). The user actions generated by computing devices 110 may be communicated to data processing system 120.

In some implementations, computing devices 110 provide location information and/or user interest information to data processing system 120 to improve the relevancy and applicability of itinerary search and visualization results. For example, data processing system 120 may use location information to narrow the scope of the travel itinerary search to include only travel itineraries having an origin location within a threshold distance of the user device submitting the search. As another example, data processing system 120 may use user interest information to determine which of the travel itineraries to display most prominently and/or to rank itineraries based on which of the itineraries the user is most likely to purchase.

In some implementations, the data processing system 120 may include a location engine 155 designed and constructed to receive or determine location data of or associated with the computing device 110. The location engine 155 may receive geo-location data points associated with a device 110. The data processing system 120 can receive the data points via a computer network 105 via a TCP/IP protocol, cell phone data network, or another communication protocol of computer network 105. The data points can include location information, or the data processing system 120 can determine the location information associated with a received data point upon receiving the data point from the device 110. The data processing system 120 can also receive an identifier associated with the data point, such as a unique device identifier, or a username associated with an application executing on the device 110. In one implementation, an application executing on the device 110 (e.g., a mobile application, a mobile operating system, a web browser, a map application, etc.) can transmit the geo-location data point that includes the location information. In one implementation, a mobile device 110 can periodically ping the data processing system 120 or other intermediate system to provide location or time information. In one implementation, a smartphone or other cellular enabled device 110 can ping a cell phone tower system, which may then provide location or time information to the data processing system 120.

To identify a location of the computing device 110, the data processing system 120 can request location or sensor data from the device 110. For example, the data processing may obtain a device 110 identifier to query a third party for location, such as a carrier or service provider associated with device 110 (e.g., a cell phone service provider or internet service provider). The device 110 may display a prompt or other notification responsive to the request for this information, to which a user of the device may grant or deny the request for information. The device 110 can also be configured to provide this information to the data processing system 120 (e.g., push location or sensor data, ping the data processing system 120). The location or sensor data may correspond to location or sensor information at or about the time of the request for content. The data processing system 120 may further receive sensor data (e.g., accelerometer data, motion data, gyroscope data) and determine whether the device is stationary, walking, driving, on public transportation, etc. In this example, the data processing system 120 may determine that the sensor data corresponds to a device activity of "walking".

The data processing system 120 can receive geo-location information, data points or pings responsive to search queries entered into a search engine or other input dialog box via the device 110. For example, the data processing system 120 can receive or determine geo-location information responsive to a request from a content publisher 115 or other web site operator. The data processing system can determine the geographic location in real time, or a predetermined time interval such as a periodic basis (e.g., 10 minutes, 5 minutes, 1 minute, 30 seconds, or another period that can facilitate the systems and methods disclosed herein). In one implementation, the device 110 pushes the data points to the data processing system 120 in real-time, periodic basis, or in a batch process. The device 110 that clicked on the content item can be different than the device 110 that provides the data points (e.g., a first user may use a desktop or laptop computer to click on the content item, and the first user or a second user different from the first user may use a mobile device or smart phone to provide data points). In some implementations, the device 110 used to click on the content item is the same as the device 110 used to generate, provide or transmit the data points.

The data points may include, or the data processing system 120 may determine, geographic location information of the geo-location data point based on, e.g., GPS, WI-FI, IP address, BLUETOOTH (e.g., a wireless technology standard for exchanging data over short distances using short-wavelength UHF radio waves from about 2.4 GHz to about 2.5 GHz, standardized as IEEE 802.15.1), near field communication ("NFC"), or cell tower triangulation techniques. In some implementations, the data processing system 120 may determine a latitude and longitude coordinate and identify a larger geographic area or cell comprising the latitude and longitude coordinate. The geographic location may correspond to a latitude or longitude coordinate, or the geographic location may correspond to a larger or smaller area, in some implementations.

In some implementations, the received data points may include, or the data processing 120 may determine, geographic location information including, e.g., latitude and longitude coordinates, geographic information system ("GIS") information, country, state, city, county, town, or precinct. The data processing system 120 may receive or otherwise identify geographic location information associated with the device 110 via an application programming interface ("API") that can provide scripted access to geographic location information associated with the device 110. In one implementation, the geographic API specification may include a specification associated with the WORLD WIDE WEB CONSORTIUM ("W3C"). In one implementation, a user of a device 110 proactively declares a location by checking-in to a location or otherwise declaring to an application executing on the device 110 or to the data processing system 120 that the user is at a location.

The geographic location of the device 110 can be determined via at least one of a global positioning system ("GPS"), cell tower triangulation, or WI-FI hotspots (wireless local area network based on a wireless standard such as IEEE 802.11). The data processing system 120 can identify or determine the technique used to determine a geographic location in order to determine an accuracy of the determined geo-location data point (e.g., GPS-based location information may be more accurate than IP-based location information). The data processing system 120 can also determine geographic location information based on an interaction with an information resource. In some implementations, the device 110 may include a global positioning system ("GPS"). For example, the data processing system 120 may determine a geographic location based on an internet protocol ("IP") address. In one implementation, the device 110 includes a GPS sensor or antenna and be configured to determine a GPS location of the device 110. The data processing system 120 can also determine the geographic location by using information obtained from one or more cell towers to triangulate the location of the device 110. In one implementation, the geographic location determined based on information received from one cell tower, two cell towers or three cell towers may be sufficient for content selection. In some implementations, WI-FI hotpots may facilitate determining a geographic location because WI-FI hotspots may be stationary and can be used as a landmark. In one implementation, the relation of a device 110 with respect to a WI-FI hotspot can facilitate determining a geographic location of the device 110.

In some embodiments, the data processing system 120 includes an itinerary engine 130. The itinerary engine can include an itinerary determination module 140. Itinerary determination module 140 may receive a search request for a travel itinerary from interface 125. The search request may include a set of search parameters (e.g., origin or departure location, destination or arrival location, departure date or time, arrival date or time, or constraints such as price, maximum number of stops, etc.). Itinerary determination module 140 may be configured to determine one or more travel itineraries that are solutions to the search request (e.g., candidate travel itineraries). For example, itinerary determination module 140 may interact with travel providers 115 and/or databases 135 to identify travel arrangements and travel itineraries that satisfy the search parameters. A travel itinerary may include one or more individual travel arrangements (e.g., one or more flights, a flight followed by a train ride, an outbound flight and an inbound flight a week later, etc.). Thus, the itinerary engine 130 can receive a search request including a departure location and an arrival location, and identify, using the database 135 or via travel provider 115, a candidate travel itinerary that satisfies the parameters in the search request. The candidate travel itinerary can include, indicate, or otherwise be associated with a departure time, and arrival time, a duration, and a price.

The data processing system 120 (e.g., via itinerary engine 130) may poll (or otherwise send a request to) a plurality of travel providers 115 to obtain travel information that includes information about candidate travel itineraries. The data processing system 120 may poll the candidate travel providers via network 105 based on a time interval (e.g., hourly, every 12 hours, daily, weekly), responsive to a condition or trigger event, or upon request.

In some implementations, the itinerary determination module 140 may identify pre-existing travel itineraries that satisfy the search parameters. For example, itinerary determination module 140 may identify travel itineraries that have an origin location that satisfies an origin location parameter of the search request and a destination location that satisfies a destination location parameter of the search request. In some implementations, itinerary determination module 140 generates new travel itineraries by combining two or more individual travel arrangements. For example, itinerary determination module 140 may combine a first flight from the origin location to an intermediate location (e.g., from Boston to Denver) with a second flight from the intermediate location to the destination location (e.g., from Denver to San Francisco) to generate an itinerary that satisfies the origin location and destination location search parameters (e.g., from Boston to San Francisco).

Itinerary determination module 140 may generate and/or identify travel itineraries that involve a single travel provider (e.g., a single airline, a single railway, etc.) or multiple travel providers (e.g., two different airlines, an airline and a bus line, etc.). Itinerary determination module 140 may search databases 135 and/or databases associated with individual travel providers 115 to identify or generate travel itineraries that satisfy the search parameters. In various implementations, itinerary determination module 140 identifies travel itineraries that include a single travel arrangement (e.g., a flight from the origin city to the destination city) or multiple travel arrangements (e.g., an inbound flight and an outbound flight, a flight from the origin city to an intermediate location and a flight from the intermediate location to the destination city, etc.). Itinerary determination module 140 may store the set of itineraries that satisfy the search parameters in a data storage device (e.g., in databases 135, in memory, etc.) for subsequent retrieval and analysis.

The itinerary determination module 140 may be further configured to analyze the set of identified travel itinerary options to determine whether each of the travel itineraries includes a single slice (e.g., a one-way trip) or multiple slices (e.g., an outbound trip and a return trip). Itinerary determination module 140 may determine whether each of the travel itineraries includes a single travel arrangement or multiple travel arrangements. For itineraries with multiple travel arrangements in the same slice or trip, itinerary determination module 140 may determine a time period and location of any stopovers (e.g., a stopover start time, a stopover end time, a stopover airport, a stopover city, etc.).

Itinerary determination module 140 may parse each of the identified travel itineraries to determine (e.g., extract, retrieve, read, etc.) various attributes thereof. For example, itinerary determination module 140 may determine an origin time and an origin location associated with each slice of a particular itinerary (e.g., an outbound slice or an inbound slice). The origin location may be a particular airport, city, bus stop, train station, address, or other geographic indicator (e.g., GPS coordinates) marking the beginning of a particular slice of the travel itinerary. The origin time may be the departure time for the first travel arrangement included in the same slice of the travel itinerary. For example, if the first travel arrangement in the outbound slice of a travel itinerary is a flight leaving Logan Airport in Boston at 8:00 AM on October 8, itinerary analysis module 214 may determine that the origin time for the outbound slice is 8:00 AM on October 8, and the origin location for the outbound slice is Boston or, more particularly, Logan Airport (i.e., airport code: BOS). Times may be expressed as a local time or a global time.

Itinerary determination module 140 may determine a destination time and a destination location associated with slice of a particular itinerary. The destination location may be a particular airport, city, bus stop, train station, address, or other geographic indicator marking the end of the same slice of the travel itinerary. The destination time may be the arrival time for the last travel arrangement included in the slice of the travel itinerary. For example, if the last travel arrangement in the outbound slice of a travel itinerary is a flight arriving in San Francisco International Airport at 1:00 PM on October 8, itinerary analysis module 214 may determine that the destination time for the outbound slice is 1:00 PM on October 8, and the destination location is San Francisco or, more particularly, San Francisco International Airport (i.e., airport code: SFO).

Itinerary determination module 140 may determine the origin time, origin location, departure time, and departure location for each slice of the identified travel itineraries. In some implementations, itinerary determination module 140 determines the origin time, origin location, departure time, and departure location for travel arrangement of a travel itinerary. For example, if an itinerary slice includes a first flight from the origin location to an intermediate location and a second flight from the intermediate location to the destination location, itinerary determination module 140 may determine the origin time, origin location, destination time, and destination location for both the first flight and the second flight. An itinerary slice can include any number of individual travel arrangements and itinerary determination module 140 can determine the attributes of each individual travel arrangement.

In some implementations, itinerary determination module 140 determines additional attributes of each identified travel itinerary. For example, itinerary determination module 140 may determine a purchase price, a travel provider (e.g., an operating airline, a marketing airline, etc.), a cabin class, an overall duration (e.g., including stopover periods), a stopover duration, a number of stopovers, a stopover location, a travel vehicle (e.g., a particular model or size of airplane), a travel modality (e.g., plane, bus, train, etc.), or other attributes of the various travel itineraries (e.g., whether a meal is served, whether travel vouchers or travel points can be used, etc.). Itinerary determination module 140 may store each travel itinerary and the various attributes thereof in a data storage device (e.g., in databases 134, in memory, etc.) for subsequent retrieval and visualization.

In some implementations, the itinerary engine 130 includes a graph display module 145. Graph display module 145 may be configured to generate display data for visualizing the set of itinerary options. The display data generated by graph display module 145 may include a user interface configured to present a graphical visual display of multiple travel itineraries, as illustrated in FIG. 3A. The graph display module 145 can generate a multidimensional graph 300 having a departure time axis 305 and an arrival time axis 310. In some implementations, the graph display module 145 can generate a multidimensional graph 300 having a departure time axis 305 and an arrival time axis 310 that are sheared or otherwise skewed or rotated such that a location on the graph representing the departure time and the arrival time also represents a duration of the travel itinerary. For example, a horizontal slice of the multidimensional graph 300 may represent a duration slice 315.

In some implementations, the multidimensional graph is a two-dimensional graph having two axes. In some implementations, the multidimensional graph is a three-dimensional graph having 3 axes. The departure time axis 305 may be a first axes and the arrival time axis 310 may be a second axes. The duration slice 315 may be a third axis. Points (e.g., T1, T2 and T3) on the graph may be defined by specifying a departure time coordinate (e.g., an x-coordinate) and an arrival time coordinate (e.g., a y-coordinate). An example of a user interface that may be generated by graph display module 145 is described in greater detail with reference to FIG. 3A.

Graph display module 145 may generate various features of a multidimensional graph upon which a set of travel itinerary options can be displayed. In some implementations, the graph display module 145 can plot, graph, or otherwise illustrate one or more candidate itineraries that satisfy the parameters of the search request. The graph display module 145 can generate one or more coordinates illustrative of the one or more candidate itineraries. The itinerary engine (e.g., via the graph display module 145) can generate a first coordinate on a first axis of the multidimensional graph corresponding to the departure time of the candidate travel itinerary. The itinerary engine can generate a second coordinate on a second axis of the multidimensional graph corresponding to the arrival time of the candidate travel itinerary. The itinerary engine can generate a location on the multidimensional graph for the first coordinate and the second coordinate. This location may indicate the duration of the candidate travel itinerary. Thus, the itinerary engine 130 can illustrate aspects of one or more candidate travel itineraries such as a departure time, arrival time, and duration on a multidimensional graph.

To illustrate the candidate itineraries on a multidimensional graph, the itinerary engine (e.g., via the graph display module 145) may generate one or more time lines. The itinerary engine 130 may generate a first set of time lines for a first axis, and a second set of time lines for a second axis. One of the first axis or the second axis may correspond to departure time, while the other of the first axis or the second axis may correspond to arrival time. In the implementation illustrated in FIG. 3A, the first axis 305 corresponds to departure time and the second axis 310 corresponds to the arrival time. The itinerary engine 130 can generate, for each axis, a corresponding set of time lines. As illustrated in FIG. 3A, the itinerary engine 130 can generate a first set of time lines 320 for the first axis, and a second set of time lines 325 for the second axis. For example, the first set of time lines 320 may correspond to departure times, while the second set of time lines 325 may correspond to arrival times.

The sets of time lines 320 and 325 may be extend from their corresponding axis. In some implementations, the time lines extend diagonally from an axis. In some implementations, the time lines may extend substantially perpendicularly from an axis or vertically (e.g., time lines 355 and 360 illustrated in FIG. 3B). In some implementations, the itinerary engine modifies, rotates, or otherwise adjusts the set of time lines to in accordance with a shear transformation (e.g., time lines 305 and 310 illustrated in FIG. 3A). For example, a shear transformation or mapping may refer to a map that displaces a point in a fixed direction, by an amount proportional to a distance from a line that is parallel to that direction. In some implementations, the shear transformation may refer to or include a linear map that displaces the point in a fixed direction by an amount proportional to a distance from the line. In some implementations, a first set of time lines extend from a first axis such that they are oblique to a second set of time lines that extend from a second axis.

The itinerary engine may establish time lines on the first axis and the second axis such that they intersect at multiple points and form a grid, as shown in FIG. 3A. Each of the time lines may be defined by a time coordinate in the multidimensional graph and may represent a global time of simultaneous occurrence. Graph display module 245 may label each of the time lines with a time value corresponding to the global time represented by the time line. For example, departure time axis 305 may include a first time line at 12 PM, a second time line at 2 PM, a third time line at 4 PM and so on. Similarly, the arrival time axis 310 may include a first time line at 8 AM, a second time line at 10 AM, a third time line at 12 PM, and so on. The times may correspond to a time of day (e.g., departure time may be times on Oct. 22, 2014; and arrival times may be times on Oct. 23, 2014).

In some implementations, graph display module 245 labels one or more of the time lines with multiple time values. Each of the time values may be a local time associated with the time line at one of the geographic locations corresponding to a departure location or an arrival location. The departure location and arrival location may be indicated on a axis label. The geographic location indication may include text, characters, symbols, colors or other indications of geography. The indication may indicate departure location and arrival location, a city, state, zip code, airport, home location, work location, vacation location, time zone (e.g., EST, PST, GMT), or some other identifier.

Graph display module 245 may generate the time lines based on the time attributes of the various travel arrangements in the set of travel itinerary options. For example, graph display module 245 may determine an earliest time and a latest time specified in the set of travel itinerary options. Graph display module 245 may generate the time lines such that some or all of the travel itinerary options are represented in the multidimensional graph. In other words, the time lines may define a time scale for the multidimensional graph. In various implementations, graph display module 245 may space the time lines at regular intervals (e.g., every two hours, every thirty minutes, every five minutes, etc.) or may generate a new time line for each time represented in the travel itinerary options (e.g., departure and arrival times for various travel arrangements).

The itinerary engine 130 can generate a first set of time lines that extend from a first axis such that they are oblique to a second set of time lines that extend from a second axis. For example, and as illustrated in FIG. 3A, the departure time lines 320 are parallel to one another, and the arrival time lines 325 are parallel to one another, but the departure time lines 320 are oblique relative to the arrival time lines 325. The itinerary engine 130 can configure the angle between the departure time lines and the arrival time lines such that a difference between a departure time coordinate and an arrival time coordinate corresponds to a duration of the candidate travel itinerary. By configuring the departure and arrival time lines to be oblique to one another, itineraries having an equal duration will have equal values of a difference between a departure time and an arrival time, so the coordinates will lie along a straight in a diagonal direction.

The itinerary engine 130 can generate a slice in a third axis that represents the duration of the candidate travel itinerary. The duration may be determined by taking a difference between the departure time and the arrival time, accounting for varying time zones. For example, the duration for candidate travel itinerary T1 illustrated in FIG. 3A is approximately 9 hours. This is determined based on a difference between the departure time coordinate of approximately 4 PM in Boston and the arrival time coordinate of approximately 7 AM in Zurich, where there is a 6 hour time difference between Boston and Zurich. The itinerary engine 130, by establishing the departure time axis and arrival time axis, can determine a location on the multidimensional graph for the candidate travel itinerary T1. The location on the multidimensional graph for candidate T1 is based on the first coordinate of the departure time axis and the second coordinate of the arrival time coordinate. The itinerary engine 130 can further generate a third axis that illustrates the duration of the candidate itinerary. The third axis, or slice duration 315, can be labeled with duration using an appropriate time increment, such as 2 hours, 1 hour, 4 hours, etc.

By using the departure time and arrival time for a candidate itinerary that satisfies search parameters received by the data processing system 120, the itinerary engine can generate a first coordinate on a first time line for the departure time (e.g., 4 PM) and a second coordinate one a second time line for the arrival time (e.g., 7 AM). The itinerary engine 130 can then generate a location on the multidimensional graph for the first coordinate and the second coordinate. The itinerary engine 130 can generate the location on the multidimensional graph by combining the first coordinate and the second coordinate. For example, the location may identify a location in a two dimensional space such as {4 PM, 7 AM}. The location may further indicate a duration of the candidate travel itinerary based on the difference between the coordinates.

In some implementations, the itinerary engine 130 can perform a shear transformation using the first coordinate and the second coordinate to generate the location. For example, the first and second axes may initially be perpendicular to one another, as illustrated in FIG. 3B. The itinerary engine 130 may then perform a shear transformation such that the resulting first and second axes are oblique to one another as illustrated in FIG. 3A. In some implementations, the angle between the first and second axis may be selected based on a difference between a first coordinate on a first axis and a second coordinate on the second axis. For example, the angle may be selected such that a scale for a slice indicating the difference facilitates identifying a duration of the candidate travel itinerary via a graphical user interface, as illustrated in FIG. 3A.

The itinerary engine 130 may further rotate the sheared coordinates about an axis to generate the location on the multidimensional graph. For example, the itinerary engine 130 may start out with the multidimensional graph illustrated in FIG. 3B where the departure time lines 355 of the departure time axis 340 are perpendicular to the arrival time lines 360 of the arrival time axis 345. In this example, the duration slice 350 is diagonal. The itinerary engine 130 may then perform a shear transformation such that the departure time lines and the arrival time lines are oblique to one another. The itinerary engine 130 may further rotate the multidimensional graph such that the duration slice is horizontal, as illustrated by the duration slice 315 shown in FIG. 3A.

By generating a location on a time-time scatter plot with coordinates based on a departure time and arrival time, performing a shear transformation and rotating the graph, the itinerary engine 130 can generate a multidimensional graph 300 with a horizontal slice 315 that indicates a duration of a candidate itinerary identified by the location on the time-time scatter plot 300. The itinerary engine 130 can display multiple candidate travel itineraries T1, T2 and T3 using this technique such that the graphical user interface 300 can display the various candidate travel itineraries that satisfy the search request. Viewing the results in the improved graphical user interface 300 generated by itinerary engine 130 may facilitate identifying a preferred candidate travel itinerary or distinguishing among candidate travel itineraries (e.g., based on duration, departure time, arrival time, etc.).

The itinerary engine 130 can create a data structure in memory for the candidate travel itinerary. The itinerary engine 130 can include, in the data structure, a location for the candidate itinerary on a multidimensional graph, where the location is based on the first coordinate based on the departure time and the second coordinate based on the arrival time. For example, the data structure may include: {first coordinate, second coordinate}. The location of the candidate travel itinerary identified by the data structure, and based on the first coordinate and the second coordinate, may indicate a duration of the candidate travel itinerary. In some implementations, the data processing system 120 can create a separate data structure for each candidate travel itinerary. In some implementations, the data processing system 120 can create a single data structure that includes some or all of the candidate travel itineraries that satisfy the search request (e.g., {(X1, Y1); (X2, Y2); (X3, Y3)} or {(X1, X2, X3), (Y1, Y2, Y3)}.

The itinerary engine 130 may identify, select, generate, allocate or otherwise use an icon to represent the candidate itinerary. The itinerary engine 130 (e.g., via graph display module 145) can allocate an icon to the data structure. The itinerary engine 130 may allocate an icon to a location of a candidate travel itinerary identified by the data structure. The itinerary engine 130 can select, identify, generate or otherwise allocate an icon based on one or more parameters of the candidate travel itinerary. The itinerary engine 130 may adjust an attribute of the icon based on a parameter of the candidate itinerary. Parameters or characteristics of a candidate itinerary can include, e.g., price, duration, travel provider (e.g., name of airline, name of bus line, name of train line), a travel modality (e.g., plane, bus, train, etc.), number of stops, duration of layover, cabin class, a travel vehicle (e.g., a particular model or size of airplane), or popularity (e.g., popularity of a candidate travel itinerary may indicate that the price may increase or that the flight may be more crowded or overbooked; this may be determined based on historical data obtained by the data processing system 120 or otherwise indicated by a travel provider 115), or other characteristics of the various travel itineraries (e.g., whether a meal is served, whether travel vouchers or travel points can be used, etc.). Attributes of the icon can include, e.g., size, color, shape, shading, texture, brightness, hue, line width, transparency, opacity, shadow effects, animation (e.g., flashing, moving), haptic feedback (e.g., bumps, different shapes, size bumps, etc.), foreground, background, z-order, etc. For example, the itinerary engine 130 can set the color of an icon to be more intense/saturated for less expensive itineraries and less intense/saturated (e.g., faded to be close to the background color) for more expensive itineraries. Itinerary engine 130 can use any type of visual display adjustment or alteration (e.g., color, texture, style, thickness, transparency, pattern, etc.) to indicate various attributes of the displayed travel itineraries.

In the illustrative implementation shown in FIG. 3A, the itinerary engine 130 allocates a first icon T1 to a first data structure corresponding to a first candidate travel itinerary, a second icon T2 to a second data structure corresponding to a second candidate travel itinerary, and a third icon T3 to a third data structure corresponding to a third candidate travel itinerary. The itinerary engine 130 can set a shading pattern attribute to each icon based on a parameter of the candidate itinerary. The itinerary engine 130 may set the shading pattern based on a travel provider providing the candidate itinerary, such as an airline. In another example, the itinerary engine 130 can set a size attribute of the icon. The itinerary engine 130 can set the size based on a parameter of the candidate travel itinerary, such as price, duration, number of stops, etc. For example, the itinerary engine 130 may set a first size of the first icon T1 for the first candidate travel itinerary to be smaller than or less than a second size of the second icon T2 for the second candidate travel itinerary because the first candidate travel itinerary is more expensive than the second candidate travel itinerary. Further, the itinerary engine 130 can set a third size of the third icon T3 of the third candidate travel itinerary to be greater than the second size because the third candidate travel itinerary is less expensive than the second candidate itinerary. Thus, but setting the size of the icons of the travel itineraries inversely proportional to the price of the travel itinerary, the itinerary engine 130 can generate an improved graphical user interface that simultaneously displays multiple travel itineraries and facilitates selecting or identifying a preferred travel itinerary based on a parameter of the travel itinerary.

The graph display module 145 can provide additional information or supplemental information along with the icon. The additional or supplemental information can include any information of or associated with the candidate travel itinerary whose icon is displayed on the multidimensional graph. In some cases, this additional information may include information that is not readily apparent from the multidimensional graph or the icon thereof. In some implementations, additional information includes display data representing characteristics of the travel itineraries in a different format (e.g., different from the graphical format used in the multidimensional graph).

In some implementations, the data processing system 120 can display the supplemental information responsive to receiving or identifying a user interaction with the multidimensional graph (e.g., via a graphical user interface, a selection, roll over, or finger gesture). The data processing system 120 (e.g., via interface) be configured to detect a user selection of one or more icons presented in the graphical display. In response to detecting a user selection of a particular icon, the graph display module 145 may determine the candidate travel itinerary that corresponds to the selected icon and display additional information about the candidate travel itinerary. The information may be displayed in a modal window, a partition of graphical visual display, or otherwise in conjunction with the graphical representation of the travel itineraries. The display generated by the graph display module 145 may be presented concurrently with the multidimensional graph.

In some implementations, graph display module 145 generates a display with additional information that includes some or all of the parameters or characteristics of the candidate travel itinerary. For example, the display may provide detailed information such as the purchase price of an itinerary, the travel provider associated with an itinerary (e.g., an operating airline, a marketing airline, etc.), a cabin class, an overall duration (e.g., including stopover periods), a stopover duration, a number of stopovers, a stopover location, a travel vehicle (e.g., a particular model or size of airplane), a travel modality (e.g., plane, bus, train, etc.), or other characteristics of the highlighted travel itineraries (e.g., whether a meal is served, whether travel vouchers or travel points can be used, etc.). The display may provide such information in a textual format or a graphical format used in the multidimensional graph.

The itinerary engine 130 can transmit, convey or otherwise provide information about the icon for display on a display device of a computing device 110. The itinerary engine 130 can transmit the data structure with the location of the icon and the attribute. The itinerary engine 130 may transmit the multidimensional graph including the icons. The itinerary engine 130 may provide instructions to a computing device 110 to display the multidimensional graph with the icons (e.g., via HTML code to a browser executing on the computing device).

In some implementations, the data processing system 120 can include an itinerary filtering module 150 designed and constructed to filter candidate itineraries for display on the multidimensional graph. The itinerary filtering module 150 may receive a constraint. The itinerary filtering module 150 can determine, identify or filter one or more candidate travel itineraries that satisfy the constraint (e.g., travel itineraries whose price is less than or equal to $500). Itinerary filtering module 150 may be configured to filter the display data representing the travel itineraries in the multidimensional graph to selectively remove travel itinerary options from the display. Itinerary filtering module 150 may be configured to generate one or more user interface elements in the graphical display to allow a user to filter the itineraries displayed in the multidimensional graph. For example, itinerary filtering module 150 may generate check-boxes, drop-down boxes, buttons, sliders, user-fillable form fields, or other user interface elements capable of receiving a user selection and/or user-provided data. Itinerary filtering module 150 may associate each of the user interface elements with a particular itinerary parameter or characteristic. Itinerary filtering module 150 may cause the user interface elements to be displayed concurrently with the multidimensional graph and the various travel itineraries.

In some implementations, itinerary filtering module 150 generates a series of user interface elements (e.g., check-boxes, buttons, etc.) allowing a user to filter the itineraries by a constraint such as a price constraint, duration constraint, a number of stops constraint, a travel provider constraint, etc. For example, itinerary filtering module 150 may generate a first user interface element labeled "less than $100," a second user interface element labeled "$100-$200," a third user interface element labeled "$200-300," and so on. In various implementations, itinerary filtering module 150 generates user interface elements allowing a user to filter the travel itineraries by any constraint or characteristic thereof (e.g., travel provider, number of stopovers, etc.). By selecting one or more of the user interface elements (e.g., checking one or more of the check-boxes), a user can select a subset of the travel itineraries to display in the multidimensional graph.

Itinerary filtering module 150 may be configured to detect a user interaction with the user interface elements presented concurrently with the various travel itineraries. Itinerary filtering module 150 may determine a filtering action to perform based on the user interaction. For example, if a user selects a user interface element associated with a particular value or range of values of a travel itinerary attribute (e.g., checking a check-box labeled "less than $100"), itinerary filtering module 150 may cause the itineraries to be filtered such that only itineraries satisfying the user-selected constraint are displayed (e.g., removing itineraries from the display that have a price of $100 or more).

When a filtering action is performed, itinerary filtering module 150 may adjust the scales used by attribute display module 150 to qualitatively represent the various attributes of the displayed travel itineraries. For example, the color intensity/saturation of an itinerary in the multidimensional graph may be used to indicate the price of the itinerary. When the entire set of itineraries is displayed, itinerary prices may range from very low to very high. High priced itineraries may have a low intensity/saturation whereas low priced itineraries may have a high intensity/saturation. If itinerary filtering module 150 removes the higher priced itineraries from the graphical display, the color intensity/saturation scale may be adjusted such that the full range of intensities/saturations is represented in the remaining travel itineraries.

In some implementations, itinerary filtering module 150 adjusts the scales used by graph display module 145 to qualitatively represent the various attributes of the displayed travel itineraries when a subset of the travel itineraries are highlighted. For example, the color intensity/saturation scale may be adjusted such that a full range of intensities/saturations is represented in the highlighted travel itineraries.

Figure 2:
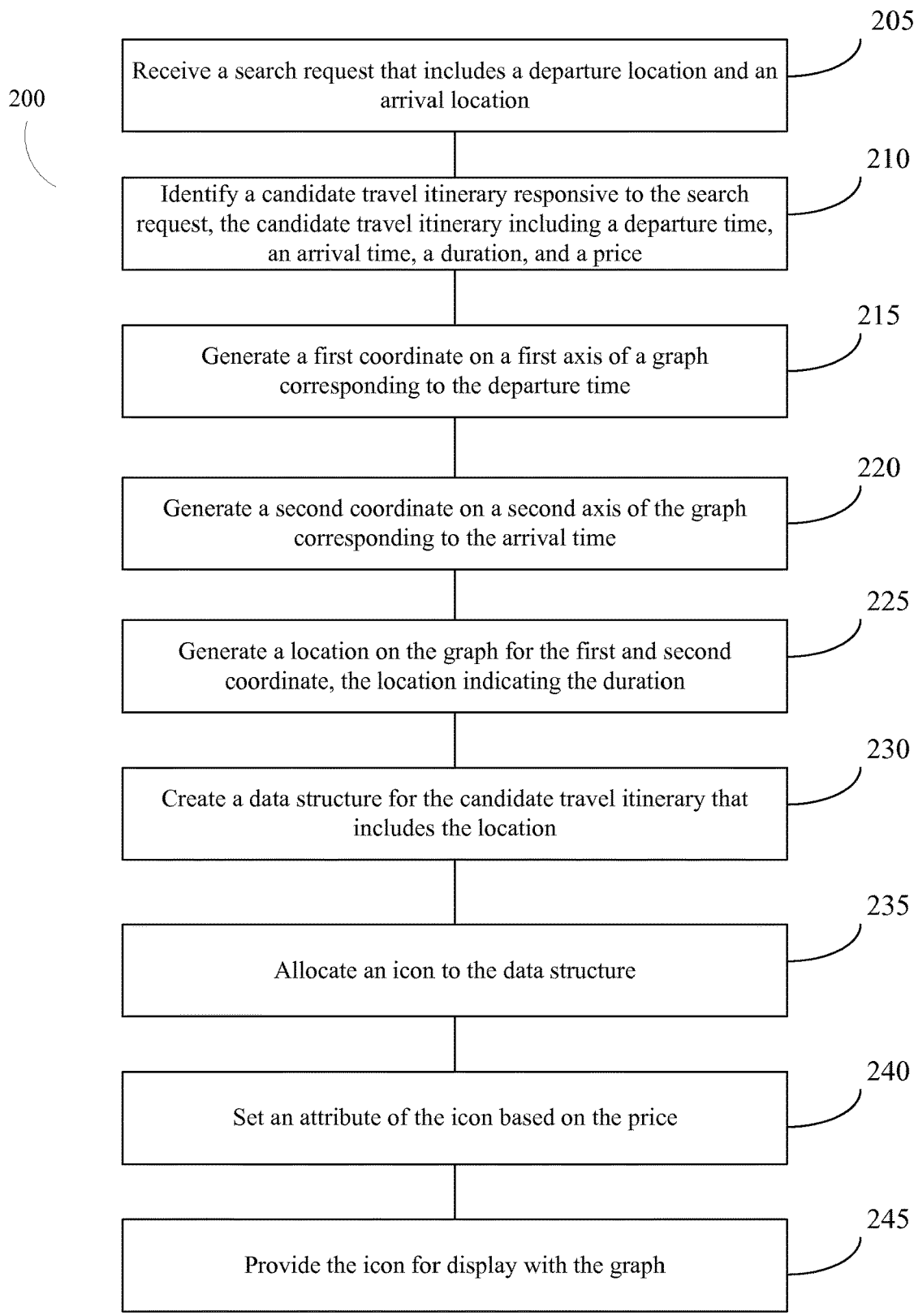
FIG. 2 is an illustration of a method displaying travel itineraries via a computer network in accordance with an implementation.

Referring now to FIG. 2, a method 200 for displaying travel itineraries via a computer network in accordance with an implementation is shown. The method 200 may be performed by system 100 shown in FIG. 1, or system 400 shown in FIG. 4, or one or more component or module thereof. The method 200 can be performed by a data processing system or one or more components there of, such as an interface, location engine, itinerary engine, itinerary determination module, graph display module, or itinerary filtering module. In brief overview, a data processing system (e.g., via an itinerary engine) receives a search request that includes a departure location and an arrival location at 205. At 210, the data processing system identifies a candidate travel itinerary. The candidate travel itinerary can be responsive to the search request and include a departure time, an arrival time, a duration and a price. At 215, the data processing system generates a first coordinate on a first axis of a graph. The first coordinate can correspond to the departure time. At 220, the data processing system can generate a second coordinate on a second axis of the graph. The second coordinate can correspond to the arrival time. At 225, the data processing system can generate a location on the graph for the first and second coordinate. This location may further indicate the duration of the candidate travel itinerary. At 230, the data processing system creates a data structure for the candidate travel itinerary that includes the location. The data structure can be stored in memory accessible by the data processing system. At 235, the data processing system allocates an icon to the data structure. At 240, the data processing system sets an attribute of the icon based on the price. At 245, the data processing system provides the icon for display with the graph.

Still referring to FIG. 2, and in further detail, a data processing system (e.g., via an itinerary engine) receives a search request that includes a departure location and an arrival location at 205. The data processing system can receive the departure location and arrival location via an interface and from a computing device. In some implementations, the data processing system can determine the departure location based on a current location of the computing device. In some implementations, the data processing system can determine the departure location using a profile associated with a user of the computing device. For example, the profile may indicate a preferred departure location, home location or work location. The profile may be stored in a database in memory of the data processing system.

At 210, the data processing system identifies a candidate travel itinerary. The candidate travel itinerary can be responsive to the search request and include a departure time, an arrival time, a duration and a price. The data processing system can perform a lookup, search, parse, or otherwise process database to identify one or more candidate travel itineraries that satisfy the search request. In some implementations, the data processing system may forward the search request to a travel provider and receive one or more candidate travel itineraries that satisfy the request.

In some implementations, the data processing system may adjust or modify the search request. For example, the search request received by the data processing system may not result in sufficient candidate travel itineraries (e.g., too few, or too expensive, or too long of a duration). This may be determined based on a number threshold (e.g., 3, 5, 10, etc.) price threshold (e.g., $500, $1,000, $1500), duration threshold (e.g., 10 hours, 15 hours, etc.), number of stops threshold (e.g., 3, 4, 5, etc.). The data processing system may automatically determine, based on the results, to adjust a parameter of the search request. For example, the data processing system may adjust the arrival location if there is another arrival location close to the requested arrival location. The data processing system may adjust a departure date or arrival date.

The one or more candidate travel itineraries identified by the data processing system can each include a departure time and an arrival time. The candidate travel itinerary can further include a price and a duration. The price may indicate the total price to travel from the departure location to the arrival location. This may include multiple tickets in the event it is a non-stop travel. The price may be in any currency. In some implementations, the price may be in a currency associated with the departure location (e.g., if the departure location is Boston, then the currency may be United States dollars). In some implementations, the price may be in a currency corresponding to a language of the web site, a current location of the computing device, based on a profile of a user of the computer device, or based on some other currency settings set via a graphical user interface of the data processing system. The duration may indicate the amount of time it takes to travel from the departure location to the arrival location. The duration may include any stops or layovers. Thus, the duration would be the difference between the departure time and the expected arrival time.

At 215, the data processing system generates a first coordinate on a first axis of a graph. The first coordinate can correspond to the departure time. The graph may be a time-time scatter plot, where the first axis is departure time and the second axis is arrival time. The first axis may be scaled based on the departure times of the resulting candidate travel itineraries that satisfy the search request. For example, if the departure times of the resulting candidate travel itineraries are 8 AM, 12 PM, and 3 PM, then the scale of the first axis may range from 8 AM to 3 PM. The first axis may include first time lines that extend from the axis. The first time lines may extend perpendicularly or vertically from the first axis. In some implementations, the first time lines may extend diagonally from the first axis. Thus, a first coordinate on the first axis may include, for example, a time such as 3:30 PM. The time may include AM and PM indicators, or may be based on a 24 hour format, such as 15:30 hours.

At 220, the data processing system can generate a second coordinate on a second axis of the graph. The second coordinate can correspond to the arrival time (e.g., the second coordinate may include 8 PM or 20:00 hours). The arrival time may be on the same day or on a different day from the departure time. The second axis may include a different scale or a similar scale to the first axis. The second axis may include second time lines that extend perpendicularly or diagonally from the second axis. In some implementations, the second time lines may be oblique to the first time lines.

At 225, the data processing system can generate a location on the graph for the first and second coordinate. This location may further indicate the duration of the candidate travel itinerary. The data processing system may generate the location by combining the first coordinate and the second coordinate. For example, if the first coordinate is 8 AM and the second coordinate is 3 PM, the location on the multidimensional graph may correspond to (8 AM, 3 PM). In some implementations, the data processing system may convert the coordinates to identify a location on the multidimensional graph in different unites (e.g., a different scale, pixels, a bitmap). The location may be generated independent of a price of the candidate itinerary. For example, the location may be generated using only the first coordinate of the departure time and the second coordinate of the arrival time, and not based on any price information. The location may indicate a duration of the candidate travel itinerary. For example, the data processing system may display an indicator or label or axis associated with the location on the multidimensional graph that indicates a duration of the candidate travel itinerary.

In some implementations, the data processing system can perform a shear transformation using the first coordinate and the second coordinate to generate the location. For example, the first and second axis may initially include time lines that are perpendicular to the axis, but the time lines may be adjusted (e.g., skewed or angled), thereby adjusting the location based on the first and second coordinate on the multidimensional graph. By performing a shear transformation based on the first and second coordinates to generate the location, the multidimensional graph can be configured such that the departure time and arrival time axes appear to be on a same axis. Further, the time lines of the departure time axis may be oblique to the time lines of the arrival time axis. By having oblique time lines, the location of the candidate itinerary on the multidimensional graph may further represent a duration of the candidate travel itinerary. Thus, the shear transformation can result in a location such that the location is indicative of a duration of the candidate travel itinerary where candidate travel itineraries with a same location have icons laying along a horizontal duration slice. For example, the duration slice may indicate a difference between the departure time and the arrival time.

In some implementations, the data processing system can rotate the sheared coordinates about an axis to generate the location on the multidimensional graph. For example, the multidimensional graph may be rotated such that the duration slice is horizontal with respect to a graphical user interface. The multidimensional graph may rotated such that the duration and arrival times axes appear at a top of the multidimensional graph or a bottom of the multidimensional graph. In some implementations, a user may control or manipulate the rotation of the multidimensional to a preferred rotation. The user may further zoom in or out on the multidimensional graph to facilitate identifying locating location points.

At 230, the data processing system creates a data structure for the candidate travel itinerary that includes the location. The data structure can be stored in memory accessible by the data processing system. The data structure can include coordinates for the location of the candidate travel itinerary on the multidimensional graph. The coordinates may include, e.g., {departure time, arrival time}. The coordinates may be transformed to other types of position coordinates, such as coordinates in a bitmap, vertical pixel, horizontal pixel, a relative position (e.g., that can be adjusted based on a display size).

In some implementations, the data processing system identifies several a plurality of candidate travel itineraries responsive to the search request. Each of the plurality of candidate travel itinerary can include a departure time, an arrival time, a duration, and a price. The data processing system can create a corresponding data structure with coordinates for each candidate travel itinerary of the plurality of candidate itineraries.

At 235, the data processing system allocates an icon to the data structure. In some implementations, the data processing system can allocate an icon (same or different icons) to a corresponding data structure for each candidate travel itinerary of a plurality of candidate travel itineraries. The icon can include any shape or symbol. The data processing system may select the icon based on characteristic or parameter of the candidate travel itinerary (e.g., a symbol corresponding to a travel provider such as an airline, or mode of travel such as a plane). The data processing system may retrieve the icon from a database. At 240, the data processing system sets an attribute of the icon based on the price. The attribute can include a color, size, size, transparency, etc. The attribute can be set based on a characteristic of the candidate travel itinerary. For example, a cheaper flight may have a bigger size as it may facilitate a user identifying a more desirable itinerary. In another example, a more expensive flight may have a brighter color (e.g., red or any color that has a greater contrast with a background of the graph) which may alert the user to the high price of the flight relative to the other flights.

In some implementations, the data processing system receives a constraint. The constraint may include a duration constraint, a price constraint, a number of stops constraint, or a travel provider constraint. The data processing system can use the constraint to filter out candidate travel itineraries such that the candidate travel itineraries that satisfy the constraint are displayed on the multidimensional graph. For example, a constraint may include itineraries that are less than $500, itineraries that have a duration of less than 10 hours, or itineraries that have 2 or less stops. The data processing system, upon receiving the constraint, can determine which candidate travel itineraries satisfy the constraint, and select the candidate travel itineraries that satisfy the constraint for display on the multidimensional graph. In some implementations, in which a candidate travel itinerary is already displayed on the graph, the data processing system can remove, from the graph, the candidate travel itineraries that do not satisfy the constraint.

At 245, the data processing system provides, transmits or otherwise conveys, via a network, the icon for display with the graph. In some implementations, the data processing system transmits, via a network, a corresponding data structure and icon for each candidate travel itinerary of a plurality of candidate travel itineraries for display via the display device. The data processing system may provide the icon along with the multidimensional graph, such as axes, time lines, axes labels, and a legend identifying what various attributes of the icon represent. The data processing system can generate the multidimensional graph with the icon for display on the display device. The data processing system can transmit, to a computing device communicatively coupled to the display device, the location and the icon allocated to the data structure for display with the multidimensional graph by the display device. The icon may include or be associated with additional information. For example, the data processing system can provide an indication of a number of stops (e.g., 2, 3, 4, etc.) of the candidate travel itinerary for display on the display device along with the icon.

Referring to FIG. 3A, an illustration of a graphical user interface for displaying travel itineraries in accordance with an implementation. The data processing system can generate the graphical user interface with multidimensional graph 300. The graph 300 can include a first axis 305 for departure time, and a second axis 310 for arrival time. The departure and arrival time axes can be labeled with information related to the departure/arrival location and date. The departure time axis can include first time lines 320 extending from the departure time axis 305. The first time lines can increment by a time interval, such as 1 hour, 2 hours, 3 hours, 4 hours, etc. As illustrated in FIG. 3A, first time lines 320 range from 12 PM to 12 AM and increment by 2 hours. The arrival time axis 310 can include second time lines 325 extending from the arrival time axis. The first and second time lines can extend diagonally from their corresponding axes such that the first time lines 320 are oblique to the second time lines 325. The angle between the first and second time lines can be determined based on scale of the graph 305. The graph 305 can include a slice duration 315 that indicates a number of hours of duration. The duration slice may appear as a third axis.

The data processing system can generate a location for each candidate itinerary on the graph 300. For example, a first candidate travel itinerary T1 can have a location corresponding to approximately 4 PM departure time and 7 AM arrival time. The location may further correspond to a duration slice of 9 hours. The data processing system can assign an icon to this first candidate travel itinerary. The icon, for example, may be a circle and have a pattern. The data processing system can display additional information with this icon, such as a price of $2110, travel provider name, number of stops, etc. Further, the data processing system can display multiple travel itineraries on the graph 300. For example, a second candidate travel itinerary T2 can have a location corresponding to approximately 8:45 PM departure time and a 11:45 AM arrival time, which can further correspond to a duration slice of approximately 9 hours. The data processing system can further display a third candidate travel itinerary at a location corresponding to a 10 PM departure time and a 3:45 PM arrival time, which correspond to a duration slice of about 11 hours and 45 minutes. The data processing system can set a size attribute for each icon based on a characteristic of the travel itinerary, such as price. Here, the price of the third candidate travel itinerary is less than the price of the first and second candidate travel itineraries, so the data processing system set the size attribute of a third icon corresponding to the third candidate travel itinerary to be greater than the size of first and second icons assigned to the first and second candidate travel itineraries, respectively.

Referring to FIG. 3A, an illustration of a graphical user interface for displaying travel itineraries in accordance with an implementation. The data processing system can generate a graph 301 with a first axis 340 for departure time and a second axis 345 for arrival time. The first and second axis may be perpendicular to one another. First time lines 355 may extend perpendicularly from the first axis 340, and second time lines 360 may extend perpendicularly from the second axis 345. The data processing system can generate a location for an itinerary on this time-time scatter plot. For example, a first travel candidate travel itinerary T1 may have a departure time of 4 PM and an arrival time of 7 AM; a second candidate travel itinerary T2 may have a departure time of 8:45 PM and an arrival time of 11:45 AM; and a third candidate travel itinerary T3 may have a departure time of 10 PM and an arrival time of 3:45 PM. The data processing system can generate a location based on coordinates of the departure and arrival times, and plot the location on graph 301. The data processing system can further generate a duration slice 350 that illustrates a duration of each candidate travel itinerary. The duration slice 350 may include duration time lines that extend diagonally with respect to the departure axis and the arrival axis. The departure axis may be perpendicular to the arrival axis. The scale for the axes may be set based on the search results.

FIG. 4 is a block diagram of a computer system 400 in accordance with an illustrative implementation. The computer system or computing device 400 can be used to implement the system 100, data processing system 120, interface 125, location engine 155, itinerary engine 130, itinerary determination module 140, graph display module 145, itinerary filtering module 150, database 135, travel provider 115, and computing device 110. The computing system 400 includes a bus 405 or other communication component for communicating information and a processor 410 or processing circuit coupled to the bus 405 for processing information. The computing system 400 can also include one or more processors 410 or processing circuits coupled to the bus for processing information. The computing system 400 also includes main memory 415, such as a random access memory (RAM) or other dynamic storage device, coupled to the bus 405 for storing information, and instructions to be executed by the processor 410. Main memory 415 can also be used for storing position information, temporary variables, or other intermediate information during execution of instructions by the processor 410. The computing system 400 may further include a read only memory (ROM) 420 or other static storage device coupled to the bus 405 for storing static information and instructions for the processor 410. A storage device 425, such as a solid state device, magnetic disk or optical disk, is coupled to the bus 405 for persistently storing information and instructions.

The computing system 400 may be coupled via the bus 405 to a display 435, such as a liquid crystal display, or active matrix display, for displaying information to a user. An input device 430, such as a keyboard including alphanumeric and other keys, may be coupled to the bus 405 for communicating information and command selections to the processor 410. The input device 430 can include a touch screen display 435. The input device 430 can also include a cursor control, such as a mouse, a trackball, or cursor direction keys, for communicating direction information and command selections to the processor 410 and for controlling cursor movement on the display 435.

The processes, systems and methods described herein can be implemented by the computing system 400 in response to the processor 410 executing an arrangement of instructions contained in main memory 415. Such instructions can be read into main memory 415 from another computer-readable medium, such as the storage device 425. Execution of the arrangement of instructions contained in main memory 415 causes the computing system 400 to perform the illustrative processes described herein. One or more processors in a multi-processing arrangement may also be employed to execute the instructions contained in main memory 415. In alternative implementations, hard-wired circuitry may be used in place of or in combination with software instructions to effect illustrative implementations. Thus, implementations are not limited to any specific combination of hardware circuitry and software.

Although an example computing system has been described in FIG. 4, implementations of the subject matter and the functional operations described in this specification can be implemented in other types of digital electronic circuitry, or in computer software, firmware, or hardware, including the structures disclosed in this specification and their structural equivalents, or in combinations of one or more of them.

Implementations of the subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices).

The operations described in this specification can be performed by a data processing apparatus on data stored on one or more computer-readable storage devices or received from other sources.

The term "data processing apparatus" or "computing device" encompasses various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand alone program or as a circuit, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more circuits, sub programs, or portions of code). A computer program can be deployed to be executed on one computer or on multiple computers that are located at one site or distributed across multiple sites and interconnected by a communication network.

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

While this specification contains many specific implementation details, these should not be construed as limitations on the scope of any inventions or of what may be claimed, but rather as descriptions of features specific to particular implementations of particular inventions. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated in a single software product or packaged into multiple software products.

References to "or" may be construed as inclusive so that any terms described using "or" may indicate any of a single, more than one, and all of the described terms.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method to display travel itineraries via a computer network, comprising:
   receiving, by an itinerary engine executing on one or more processors of a data processing system, a search request for a travel itinerary;
   identifying, by the itinerary engine using a database storing travel information, a candidate travel itinerary responsive to the search request;
   generating, by the itinerary engine, a first coordinate on a first axis of a multidimensional graph corresponding to a departure time of the candidate travel itinerary;
   generating, by the itinerary engine, a second coordinate on a second axis of the multidimensional graph corresponding to an arrival time of the candidate travel itinerary, wherein the second axis is perpendicular to the first axis;
   determining, by the itinerary engine, a location on the multidimensional graph based on the first coordinate and the second coordinate;
   indicating, in the multidimensional graph, a duration slice comprising one or more duration time lines that extend diagonally with respect to the first axis and the second axis, each duration time line indicating a flight duration corresponding to any location on the multidimensional graph falling along the duration time line;
   creating, by the itinerary engine, a data structure in memory for the candidate travel itinerary, the data structure indicating the location on the multidimensional graph that indicates the duration of the candidate travel itinerary in the duration slice;
   allocating, by the itinerary engine, an icon to the data structure indicating the departure time, the arrival time, and a price of the candidate travel itinerary;
   setting, by the itinerary engine, an attribute of the icon of the candidate travel itinerary based on the price of the candidate travel itinerary;
   transmitting, by the data processing system to a display device via the computer network, the icon allocated to the data structure and instructions to display the icon with the multidimensional graph comprising the duration slice, wherein the display device displays the icon with the multidimensional graph;
   receiving, by the data processing system from the display device, instructions to rotate the multidimensional graph comprising the icon;
   in response to receiving the instructions to rotate the multidimensional graph comprising the icon, rotating the multidimensional graph comprising the icon so that the duration slice is horizontal with respect to the first axis; and
   transmitting, by the data processing system to the display device via the computer network, the rotated multidimensional graph comprising the icon and instructions to display the rotated multidimensional graph comprising the icon; and
   displaying, by the display device, the rotated multidimensional graph comprising the icon.

2. The method of claim 1, further comprising:
   performing, by the itinerary engine, a shear transformation using the first coordinate and the second coordinate to determine the location, wherein the location is indicative of the duration of the candidate travel itinerary.

3. The method of claim 1, further comprising:
   performing, by the itinerary engine, a shear transformation based on a difference between the first coordinate and the second coordinate to determine the location, wherein the location is indicative of the duration of the candidate travel itinerary.

4. The method of claim 1, further comprising:
   performing, by the itinerary engine, a shear transformation using the first coordinate and the second coordinate to generate sheared coordinates, wherein the sheared coordinates are indicative of the duration of the candidate travel itinerary; and
   rotating, by the itinerary engine, the sheared coordinates about an axis to determine the location on the multidimensional graph.

5. The method of claim 1, further comprising:
   receiving, by the itinerary engine, a constraint; and
   determining, by the itinerary engine, a plurality of candidate travel itineraries that satisfy the constraint, wherein the plurality of candidate travel itineraries comprises the candidate travel itinerary.

6. The method of claim 5, wherein the constraint comprises at least one of a duration constraint, a price constraint, a number of stops constraint, or a travel provider constraint.

7. The method of claim 1, wherein the first axis is oblique to the second axis.

8. The method of claim 1, wherein the attribute comprises at least one of color or size.

9. The method of claim 1, further comprising:
   setting, by the itinerary engine, a second attribute of the icon of the candidate travel itinerary based on a travel provider of the candidate travel itinerary.

10. The method of claim 1, further comprising:
polling, by the data processing system via the network responsive to a time interval, a plurality of travel providers to obtain the travel information.

11. The method of claim 1, further comprising:
providing, by the itinerary engine, an indication of a number of stops of the candidate travel itinerary for display on the display device, the number of stops greater than two.

12. The method of claim 1, further comprising:
identifying, by the itinerary engine, a plurality of candidate travel itineraries responsive to the search request, each candidate travel itinerary of the plurality of candidate itineraries including a departure time, an arrival time, a duration, and a price;
creating, by the itinerary engine, a corresponding data structure with coordinates for each candidate travel itinerary of the plurality of candidate itineraries;
allocating, by the itinerary engine, an icon to the corresponding data structure for each candidate travel itinerary of the plurality of candidate travel itineraries; and
transmitting, by the data processing system via the network, the corresponding data structure and icon for each candidate travel itinerary of the plurality of candidate travel itineraries for display via the display device.

13. The method of claim 1, wherein the location is determined independent of the price, and a location of the icon on the multidimensional graph is not based on the price.

14. The method of claim 1, further comprising:
transmitting, by the data processing system to a computing device communicatively coupled to the display device, the location and the icon allocated to the data structure for display with the multidimensional graph by the display device.

15. A system to display travel itineraries via a computer network, comprising:
a database that stores, in memory of a data processing system, travel information;
an itinerary engine of a data processing system comprising one or more processors communicatively coupled to the database, wherein the one or more processors execute application code instructions that are stored in the database to cause the system to:
receive a search request for a travel itinerary, the search request including a departure location and an arrival location;
identify, using the database, a candidate travel itinerary responsive to the search request, the candidate travel itinerary including a departure time, an arrival time, a duration, and a price;
generate a first coordinate on a first axis of a multidimensional graph corresponding to the departure time of the candidate travel itinerary;
generate a second coordinate on a second axis of the multidimensional graph corresponding to the arrival time of the candidate travel itinerary, wherein the second axis is perpendicular to the first axis;
determine a location on the multidimensional graph based on the first coordinate and the second coordinate;
indicate, in the multidimensional graph, a duration slice comprising one or more duration time lines that extend diagonally with respect to the first axis and the second axis, each duration time line indicating a flight duration corresponding to any location on the multidimensional graph falling along the duration time line;
create a data structure in memory for the candidate travel itinerary, the data structure indicating the location, wherein the location is indicative of the duration of the candidate travel itinerary in the duration slice;
allocate an icon to the data structure indicating the departure time, the arrival time, and a price of the candidate travel itinerary;
set an attribute of the icon of the candidate travel itinerary based on the price of the candidate travel itinerary;
transmit, to a display device via the computer network, the icon allocated to the data structure and instructions to display the icon with the multidimensional graph comprising the duration slice, wherein the display device displays the icon with the multidimensional graph;
receive, from the display device, instructions to rotate the multidimensional graph comprising the icon;
in response to receiving the instructions to rotate the multidimensional graph comprising the icon, rotate the multidimensional graph comprising the icon so that the duration slice is horizontal with respect to the first axis; and
transmit, to the display device via the computer network, the rotated multidimensional graph comprising the icon and instructions to display the rotated multidimensional graph comprising the icon, wherein the display device displays the rotated multidimensional graph comprising the icon.

16. The system of claim 15, wherein the one or more processors are further configured to execute application code instructions that are stored in the database to cause the system to:
perform a shear transformation based on a difference between the first coordinate and the second coordinate to determine the location, wherein the location is indicative of the duration of the candidate travel itinerary.

17. A non-transitory computer readable storage device having instructions embodied thereon that, when executed by one or more processors, displays travel itineraries via a computer network, the instructions comprising instructions to:
receive a search request for a travel itinerary;
identify, using a database storing travel information, a candidate travel itinerary responsive to the search request;
generate a first coordinate on a first axis of a multidimensional graph corresponding to a departure time of the candidate travel itinerary;
generate a second coordinate on a second axis of the multidimensional graph corresponding to an arrival time of the candidate travel itinerary, wherein the second axis is perpendicular to the first axis;
determine a location on the multidimensional graph based on the first coordinate and the second coordinate;
indicate, in the multidimensional graph, a duration slice comprising one or more duration time lines that extend diagonally with respect to the first axis and the second axis, each duration time line indicating a flight duration corresponding to any location on the multidimensional graph falling along the duration time line;

create a data structure in memory for the candidate travel itinerary, the data structure indicating the location, wherein the location is indicative of the duration of the candidate travel itinerary in the duration slice;

allocate an icon to the data structure indicating the departure time, the arrival time, and a price of the candidate travel itinerary;

set an attribute of the icon on the candidate travel itinerary based on the price of the candidate travel itinerary;

transmit, to a display device via the computer network, the icon allocated to the data structure and instructions to display the icon with the multidimensional graph comprising the duration slice, wherein the display device displays the icon with the multidimensional graph;

receive, from the display device, instructions to rotate the multidimensional graph comprising the icon;

in response to receiving the instructions to rotate the multidimensional graph comprising the icon, rotate the multidimensional graph comprising the icon so that the duration slice is horizontal with respect to the first axis; and transmit, to the display device via the computer network, the rotated multidimensional graph comprising the icon and instructions to display the rotated multidimensional graph comprising the icon, wherein the display device displays the rotated multidimensional graph comprising the icon.

18. The computer readable storage device of claim 17, wherein the location is determined independent of the price, and the location of the icon on the multidimensional graph is not based on the price.

19. The computer readable storage device of claim 17, wherein determining the location on the multidimensional graph comprises performing a shear transformation using the first coordinate and the second coordinate.

20. The computer readable storage device of claim 17, wherein determining the location on the multidimensional graph comprises performing a shear transformation based on a difference between the first coordinate and the second coordinate.

* * * * *